No. 655,374. Patented Aug. 7, 1900.
J. N. SALMON.
GATE.
(Application filed Mar. 24, 1900.)
(No Model.)
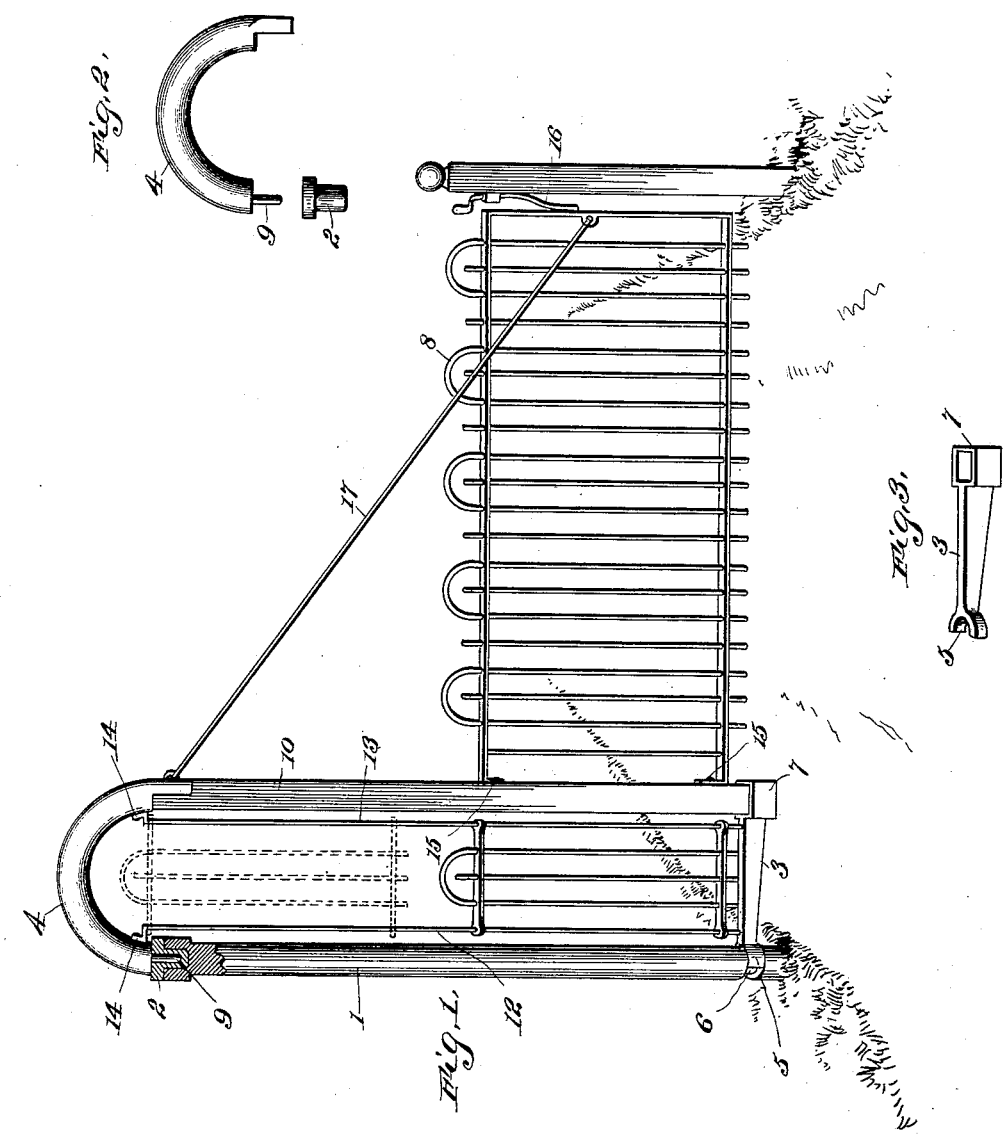
Witnesses.
Henry Moore
S. A. Anderson
Inventor:
James Nelson Salmon

UNITED STATES PATENT OFFICE.

JAMES NELSON SALMON, OF LATHROP, CALIFORNIA.

GATE.

SPECIFICATION forming part of Letters Patent No. 655,374, dated August 7, 1900.

Application filed March 24, 1900. Serial No. 10,047. (No model.)

*To all whom it may concern:*

Be it known that I, JAMES NELSON SALMON, a citizen of the United States, residing at Lathrop, in the county of San Joaquin and State of California, have invented a new and useful Gate, of which the following is a specification.

My invention relates to farm-gates, and more particularly to that class of gates in which the larger gate is provided with a smaller or supplemental gate which may be opened for passage without requiring the larger gate to be opened, but which will be opened or moved from across the path by the opening of the larger gate.

With these objects in view my invention consists in the improved construction and novel arrangement of parts of a gate, as will be hereinafter more fully set forth.

In the accompanying drawings, in which the same reference-numerals indicate corresponding parts in each of the views in which they occur, Figure 1 is a perspective view of my improved gate in its closed position, some of the parts being shown in section and the smaller gate being shown in its raised position in dotted lines; and Figs. 2 and 3 are detail views.

In constructing my improved gate I employ a post 1 of sufficient height to accommodate the movement of the smaller gate and provided at its upper end with a suitable socket, which is preferably formed in a casting 2, secured thereto. The hinges for the gate comprise what I shall call a "box-hinge" 3 at the bottom and an "arch-hinge" 4 at the top. The inner end of the box-hinge is formed into or provided with a yoke 5, which fits within a suitable groove or bearing 6 at the lower end of the post 1 and has its outer end formed into or provided with a box 7, within which is rigidly secured the lower end of the gate 8. The arch-hinge is curved into a substantial semicircle and is located at the top of the gate and post like an arch and is provided at one end with a pintle 9, which fits into the socket in the top of the post 1 and has its opposite end rigidly secured to the upper end of the rear upright or end piece 10 of the gate.

The length of the hinges is sufficient to accommodate between their ends the smaller gate 11, which may be of any suitable construction and design and is arranged to slide vertically upon rods 12 and 13—as, for instance, by means of suitable eyes—the rods being secured at their lower ends in the hinge 3 and at their upper ends to the arch 4, as shown at 14. When constructed in this manner, it is evident that when the larger gate is swung upon its hinges the smaller gate will be carried around with it in the same manner as though it were rigidly secured thereto, yet at the same time the smaller gate can be moved vertically upon the rods to permit the passage of a person or an animal underneath it without requiring the larger gate to be moved.

The larger gate may be of any desired form or structure, metallic or wood, or both, and may have its top and bottom pieces secured to the end piece 10, as shown at 15. Its opposite or free end is provided with any kind of suitable latch 16, and a brace-rod 17 extends therefrom to the upper end of the end piece 10 to prevent the gate from sagging.

As above described, my gate can be constructed very cheaply and of sufficient strength to withstand all ordinary usage and will be found much more convenient than the ordinary form of gate. Although I have shown what I consider to be the most desirable form of constructing my gate, yet I reserve to myself the right to make such changes and alterations therein as will come within the scope of my invention.

Having thus fully described my invention, what I claim as new, and desire to secure by Letters Patent of the United States, is—

1. In a gate, the combination, with a post, of a box-hinge at the lower end and an arch-hinge at the upper end, a gate, the rear end of which is secured to said hinges, and a small gate between said end and the post, substantially as described.

2. In a gate, the combination, with a post, the upper end of which is provided with a socketed casting and the lower end is provided with a track, of an arch-hinge and a box-hinge, the arch-hinge being provided with a pintle to fit in the socket and the box-hinge being provided at its inner end with a yoke to engage with said track, a gate, the rear end of which is secured to said hinges, and a vertically-sliding gate between said end and the post, substantially as described.

3. In a gate, the combination, with a post, of an arch-hinge provided with brackets and a box-hinge provided at its outer end with a box, of a gate, the rear end of which is rigidly secured at its upper end to the arch-hinge and has its lower end rigidly secured within the box of the box-hinge, two rods, the upper ends of which are secured to the arch-hinge and the lower ends are secured in the box-hinge, and a gate arranged to slide vertically upon said rods, substantially as described.

JAMES NELSON SALMON.

Witnesses:
C. E. ANDERSON,
C. HOVELL, Jr.